United States Patent
Jones et al.

(10) Patent No.: US 9,165,277 B2
(45) Date of Patent: Oct. 20, 2015

(54) DISCREPANCY ANALYSIS OF RFID READS TO DETERMINE LOCATIONS

(71) Applicant: Wal-Mart Stores, Inc., Bentonville, AR (US)

(72) Inventors: Nicholaus Adam Jones, Fayetteville, AR (US); Jarrod Lee Bourlon, Centerton, AR (US); Thomas Edward Stiefel, Bentonville, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 139 days.

(21) Appl. No.: 13/862,110

(22) Filed: Apr. 12, 2013

(65) Prior Publication Data

US 2014/0263636 A1    Sep. 18, 2014

Related U.S. Application Data

(60) Provisional application No. 61/789,710, filed on Mar. 15, 2013.

(51) Int. Cl.
*G06F 19/00* (2011.01)
*G06Q 30/00* (2012.01)
*G08B 13/14* (2006.01)
*G06Q 10/08* (2012.01)

(52) U.S. Cl.
CPC .................................. *G06Q 10/087* (2013.01)

(58) Field of Classification Search
CPC .................................................. G06K 7/10366
USPC ........................................ 235/385; 340/572.1
See application file for complete search history.

(56) References Cited

U.S. PATENT DOCUMENTS

| | | | |
|---|---|---|---|
| 7,602,288 B2 | 10/2009 | Broussard | |
| 2003/0216969 A1 | 11/2003 | Bauer et al. | |
| 2010/0019035 A1 | 1/2010 | Larson et al. | |
| 2012/0086553 A1 | 4/2012 | Wilkinson et al. | |
| 2012/0086554 A1 | 4/2012 | Wilkinson et al. | |
| 2012/0161967 A1 | 6/2012 | Stern | |

*Primary Examiner* — Daniel Hess
(74) *Attorney, Agent, or Firm* — McCarter & English, LLP; David R. Burns (57) ABSTRACT

According to an embodiment, a computer-implemented method of managing inventory includes receiving, at an antenna operatively coupled to a radio-frequency identification (RFID) reader, product identification information encoded in an RF signal transmitted by a plurality of RFID tags. Each of the RFID tags is associated with a respective one of a plurality of products. The method further includes processing, by a processor and using the product identification information, information contained in a portion of the encoded RF signal to compare apparent location information associated with the RFID reader with prior location information associated with at least one of the products, and updating, by the processor, the apparent location information to match the prior location information where the apparent location information is different than the prior location information.

19 Claims, 6 Drawing Sheets

DISCREPANCY ANALYSIS OF RFID READS TO DETERMINE LOCATIONS

CROSS-REFERENCE TO RELATED APPLICATIONS

This application claims priority under 35 U.S.C. §119(e) to U.S. Provisional Patent Application Ser. No. 61/789,710, entitled "DISCREPANCY ANALYSIS OF RFID READS TO DETERMINE LOCATIONS" and filed on Mar. 15, 2013, which is hereby incorporated by reference in its entirety.

BACKGROUND

Embodiments of the disclosure relate generally to data processing, and more particularly to methods and systems for using radio frequency identification (RFID) tag data to determine the location of a mobile RFID reader.

Radio-frequency identification (RFID) has been used for inventory management, i.e., by reading identification information stored on RFID tags attached to various objects, such as retail products. RFID is a wireless, non-contact system that uses radio-frequency electromagnetic fields to transfer data from a tag attached to an object for automatic identification and tracking. A conventional RFID system includes one or more RFID tags and an RFID reader. Each RFID tag includes a transponder having a radio frequency integrated circuit (RFIC) and an antenna for receiving an interrogation signal from the RFID reader and emitting a response signal. The RFIC can store identification information or other data and output such data in the response signal upon receiving the interrogation signal. The RFID reader includes an antenna and a transceiver. The transceiver includes a transmitter, a receiver, and a decoder for processing data in the signal emitted by the RFID tag. The RFID reader can be a mobile, handheld device, or the RFID reader can be mounted in a fixed location, depending on the particular application. When the antenna of the RFID reader is within an effective range for activating the transponder, the transponder is activated by the electromagnetic field from the antenna of the RFID reader. Data can be transmitted by the transponder in the RFID tag to the transceiver of the RFID reader wirelessly. The transceiver of the RFID reader can decode the data received from the transponder. The decoded information can be processed by the RFID reader or transmitted to another computing device for processing.

RFID tags may include active, passive, or semi-passive transponders. Active and semi-active transponders are powered by a battery, while passive transponders obtain power from the interrogation signal emitted by the RFID reader. Active transponders can initiate communication with an RFID reader, whereas passive and semi-passive transponders are typically activated only when interrogated by the RFID reader. Multiple RFID tags may be located in the same radio frequency field and may be read one at a time or simultaneously.

SUMMARY

Conventionally, the user of a mobile RFID reader manually enters location information into the RFID reader so that the location of items having RFID tags can be determined as the RFID tags are scanned. However, if the manually entered location information is incorrect, the location of the scanned RFID tags will also be incorrect.

According to an embodiment, a computer-implemented method of managing inventory includes receiving, at an antenna operatively coupled to a radio-frequency identification (RFID) reader, product identification information encoded in an RF signal transmitted by a plurality of RFID tags. Each of the RFID tags is associated with a respective one of a plurality of products. The method further includes processing, by a processor and using the product identification information, information contained in a portion of the encoded RF signal to compare apparent location information associated with the RFID reader with prior location information associated with at least one of the products, and updating, by the processor, the apparent location information to match the prior location information where the apparent location information is different than the prior location information. In this manner, the location of the RFID reader may be updated if the apparent location information (e.g., manually entered location) is incorrect.

In some embodiments, comparing the apparent location information may include retrieving, by the processor from a database, machine-readable product data representing the prior location information associated with each of the products. In some embodiments, updating the apparent location information may further include updating the apparent location information to match the prior location information where the prior location information associated with a majority of the products is different from the apparent location information. In some embodiments, the prior location information may include product location information associated with at least one of the products received on at least two different occasions prior to comparing the apparent location with the prior location information.

In some embodiments, the method may include displaying, by the processor via a display, the prior location information and/or the apparent location information. In some embodiments, the prior location information and the apparent location information may each represent at least one physical location. In some embodiments, the method may further include displaying, by the processor via the display, information representing the physical location(s).

In some embodiments, the product identification information may be received while the physical location of the reader is substantially static. In some embodiments, the product identification information may be read over a predetermined period of time.

According to an embodiment, an inventory management system includes a programmable processor, and a memory operatively coupled to the processor. The memory has stored thereon computer-executable instructions that when executed by the processor cause the processor to receive, at an antenna operatively coupled to a radio-frequency identification (RFID) reader, product identification information encoded in an RF signal transmitted by a plurality of RFID tags. Each of the RFID tags is associated with a respective one of a plurality of products. The memory has further stored thereon computer-executable instructions that when executed by the processor cause the processor to process, using the product identification information, information contained in a portion of the encoded RF signal to compare apparent location information associated with the RFID reader with prior location information associated with each of the products, and update the apparent location information to match the prior location information where the apparent location information is different than the prior location information.

In some embodiments, the memory may further include instructions that when executed by the processor cause the processor to compare the apparent location information by retrieving, from a database, machine-readable product data representing the prior location information associated with each of the products. In some embodiments, the memory may further include instructions that when executed by the processor cause the processor to update the apparent location information to match the prior location information where the prior location information associated with a majority of the plurality of products is different from the apparent location information. In some embodiments, the prior location information may include product location information associated with the respective one of the plurality of products received on at least two different occasions prior to comparing the apparent location with the prior location information.

In some embodiments, the memory may further include instructions that when executed by the processor cause the processor to display, via a display, the prior location information and/or the apparent location information. In some embodiments, the prior location information and the apparent location information each represent at least one physical location. In some embodiments, the memory may further include instructions that when executed by the processor cause the processor to display, via a display, information representing the at least one physical location.

In some embodiments, the product identification information may be received while the physical location of the reader is substantially static. In some embodiments, the product identification information may be read over a predetermined period of time.

According to an embodiment, a non-transitory computer-readable medium has stored thereon computer-executable instructions that when executed by a computer cause the computer to receive, at an antenna operatively coupled to a radio-frequency identification (RFID) reader, product identification information encoded in an RF signal transmitted by a plurality of RFID tags. Each of the plurality of RFID tags is associated with a respective one of a plurality of products. The non-transitory computer-readable medium has further stored thereon computer-executable instructions that when executed by a computer cause the computer to process, using the product identification information, information contained in a portion of the encoded RF signal to compare apparent location information associated with the RFID reader with prior location information associated with at least one of the products, and update the apparent location information to match the prior location information where the apparent location information is different than the prior location information.

In some embodiments, the prior location information may include product location information associated with the at least one of the plurality of products received on at least two different occasions prior to comparing the apparent location with the prior location information.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

According to various embodiments, computer-implemented methods, computer-readable media and physical inventory management systems are disclosed for identifying the location of a mobile radio frequency identification (RFID) reader using RFID tag data.

Figure 1:
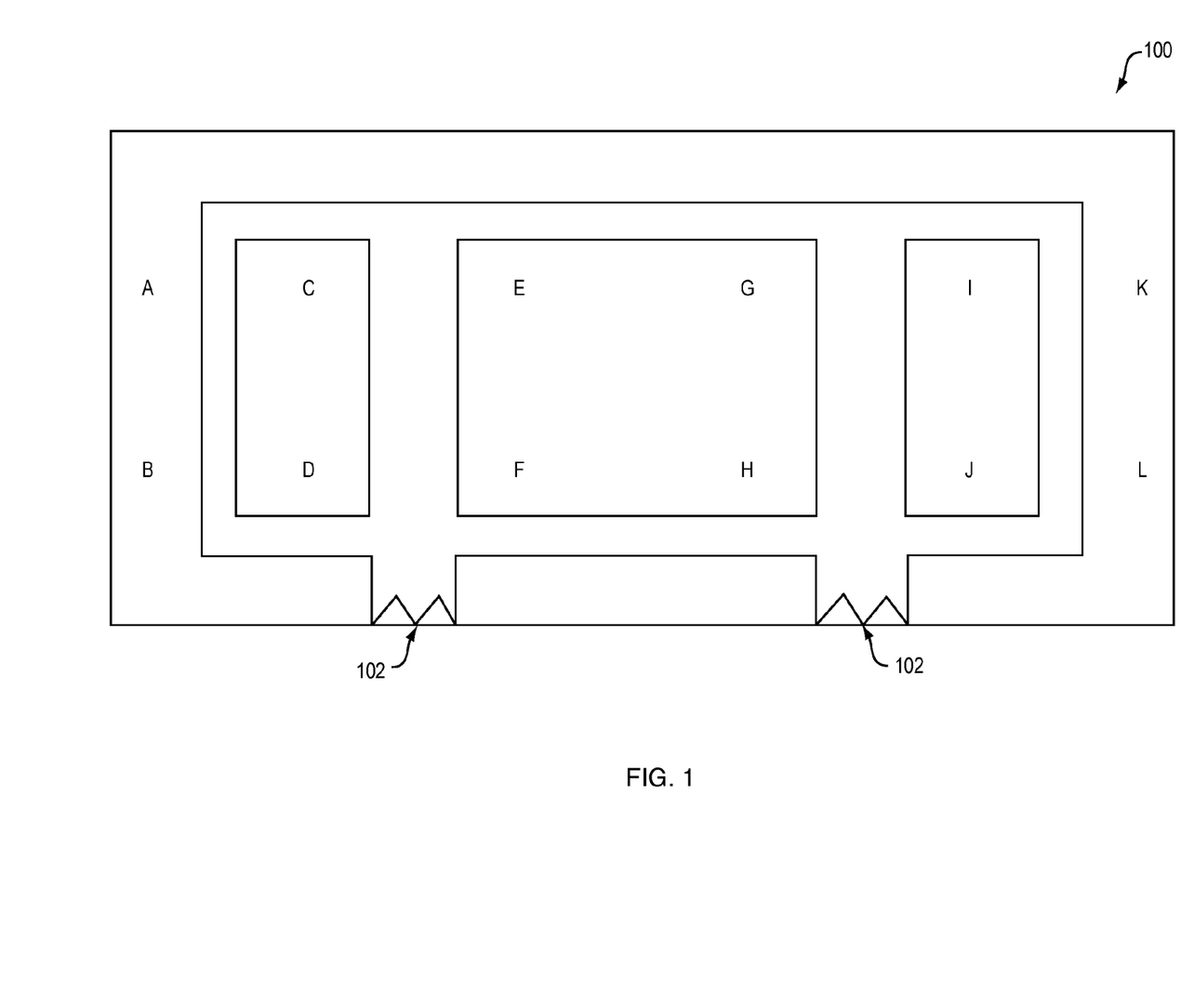
FIG. 1 depicts an example plan view of a retail store for illustrating certain aspects of some embodiments described herein.

In a retail environment, various products or other goods are usually stocked at specific locations within a store. FIG. 1 depicts a plan view of an exemplary retail store 100 having various locations (e.g., departments) indicated at A-L throughout the store. Merchandise items may be stocked at any location A-L in the store 100. It will be understood that the store 100 may include any number of distinct locations for stocking merchandise items. For example, men's clothing may be stocked in one location while women's clothing may be stocked in a different location. Furthermore, often multiple units of the same products are stocked together, for example, twenty pairs of Brand A men's jeans may be arranged in one pile on a display shelf, and another twenty pairs of Brand B men's jeans may be arranged in a separate pile on the same shelf or a different display shelf in the same department. In addition to items that are stocked in retail areas, some items may be stored or held in other areas, such as backrooms, loading docks, storage containers or storage closets.

In one example, multiple items of one product may be received at a loading dock and temporarily held in a backroom before being stocked in one or more usual locations, such as men's clothing in the men's clothing department A, and women's clothing in the women's clothing department B. Thus, while the items are at the store, they may be placed in more than one location before they are sold to customers and taken from the store. According to some embodiments, it is desirable to identify the location of the items using, for example, RFID technology, such as by using RFID tag readers to read RFID tags associated with the various items.

Figure 2:
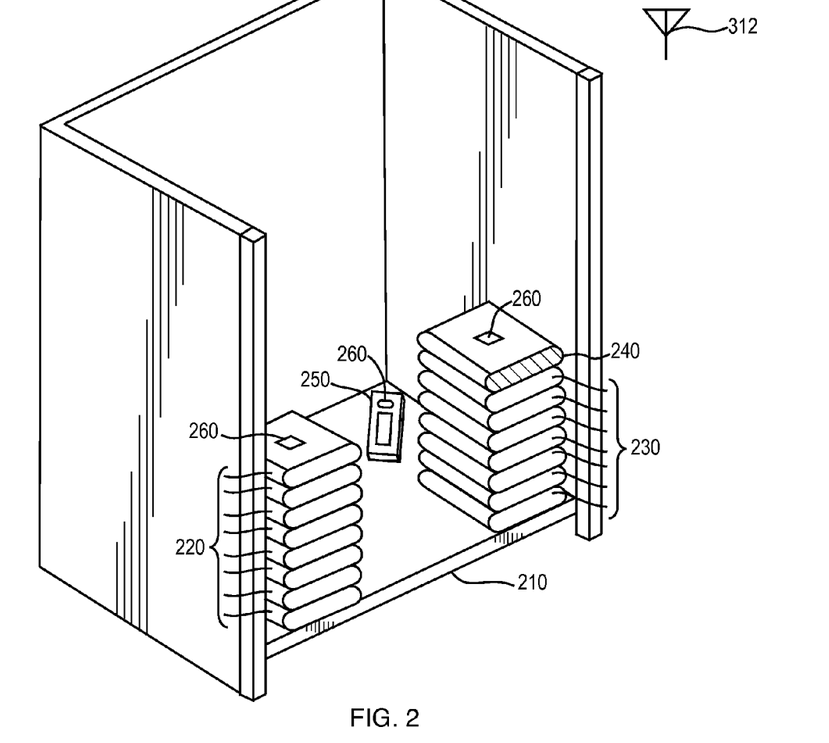
FIG. 2 depicts an example perspective view of a shelf containing various RFID-tagged products for illustrating certain aspects of some embodiments described herein.

FIG. 2 is a perspective view of an exemplary retail store shelf 210 upon which various merchandise items 220, 230, 240 and 250 are placed. The shelf 210 may, for example, be located in any one of the departments A-L in the store 100 of FIG. 1, including any retail areas or storage areas. In this example, the shelf 210 contains eight pairs of Brand A men's jeans 220, five pairs of Brand B men's jeans 230, one pair of Brand C women's jeans 240, and a package of playing cards 250. RFID tags 260 attached to each item contain product identification data that, when read, or scanned, by an RFID reader located within the reading range of the RFID tags, can be used to identify individual units of stock. The data may include, but not be limited to, transponder identification, product identification, location information, Universal Product Codes (UPC), and/or Electronic Product Codes (EPC). The EPC is a standardized identifier that provides a permanent and unique digital, machine-readable identity for all products. In some embodiments, each RFID tag 260 includes a transponder that is configured to emit a machine-readable signal containing the product identification data for uniquely identifying the item and/or location of the item to which it is attached. The transponder can be active, passive or battery assisted passive. If the transponder is passive or battery assisted passive, and power can be applied (e.g., to an antenna within range of the RFID tag) to provoke the RFID tag to emit a signal. If the RFID tag is active, such power may not be necessary.

Figure 3:
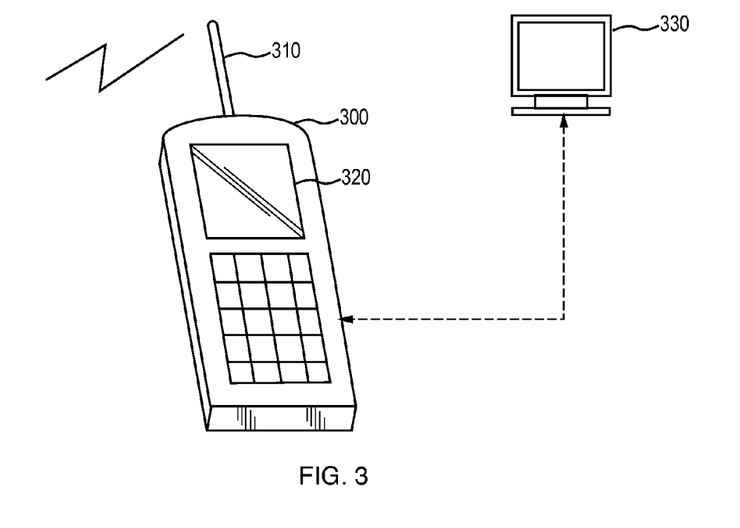
FIG. 3 depicts an example of an RFID reader, antenna and computing device, in accordance with some embodiments.

FIG. 3 depicts an exemplary RFID reader 300. In some embodiments, the RFID reader can be mobile (e.g., handheld), having an antenna 310 for receiving the product identification information stored in the RFID tag and a display 320 (e.g., a touchscreen display) and keypad 322 for entering information (e.g., location information) and/or displaying the product identification information or other information to a user. The RFID reader 300 can, in some embodiments, receive information (e.g., user input via a user interface) for identifying the location (e.g., Department A-L) in which it is being used. The RFID reader 300 may, for example, include a R1000/R2000 RFID integrated circuit (IC) chip, manufactured by Impinj, Inc. of Seattle, Wash. The RFID reader 300 can be configured to receive and process the signal emitted by the RFID tag 260 while the antenna 310 is within reading range of the signal. In some embodiments, the antenna can be separate from the RFID reader 300, for example, antenna 312, which can be mounted on a wall, shelf or ceiling, and remotely connected to the RFID reader.

In operation, the RFID reader 300 communicates with the RFID tags 260 in a conventional manner. For example, with a passive RFID tag 260, the RFID reader 300 interrogates and powers the RFID tag 260 so that the RFID tag 260 communicates information stored in the RFID tag 260 to the RFID reader 300. The RFID reader 300 then processes the information and/or transmits the information to a remote computer 330 for further processing.

Each RFID reader 300 can be associated with a reader antenna, such as antenna 310 (e.g., via a wired connection) or fixed position antenna 312 (e.g., via a wireless connection). In an embodiment, the RFID reader 300 is a handheld, mobile unit that can be carried to different locations A-L in the retail store 100. The associated antenna 310 is placed into proximity of the reading range of the RFID tags 260, and the RFID tags 260 are read. In another embodiment, the RFID reader 300 is mobile, but the associated antenna 310 is located in a fixed position within reading range of the RFID tags 260. The size and configuration of the antennas 310 and 312 can be designed to provide various reading ranges (e.g., one antenna for coverage of the entire shelf 210 or multiple antennas for coverage of different portions of the shelf 210), as will be understood by one of skill in the art.

A retail environment, such as the retail store 100 of FIG. 1, is potentially susceptible to multipath errors due to metal or other structures in the store 100 that reflect the electromagnetic waves emitted and received by the RFID antenna 300, 302. Multipath errors are caused when a radio signal is received directly by an antenna and when the same signal is received again as it is reflected off an interfering structure. The use of preprocessing filters can minimize the effects of multipath by filtering out erroneous signals.

The RFID reader 300 can extract and process the product identification data, or other data (e.g., a transponder identification code), contained in the signal. In some embodiments, the product identification data may include, for example, a stock keeping unit (SKU) number, a manufacturer product number, a brand identifier, a model identifier, a product category, a department number, a cut, a quantity, a pack-type identifier, a style, a season, a size, and/or a color associated with the product to which the RFID tag is attached. In some other embodiments, the data received from the RFID tag can be used to identify the product in other ways, such as by cross-referencing the RFID tag data to product data stored in a database. The product data may include one or more characteristics associated with the product, such as brand name, product name or model number, product category (e.g., men's pants, vitamins, paper towels, etc.), SKU number, manufacturer identification number, or other characterizing information. In the example of FIG. 2, items 220 and 230 are both men's jeans, while items 240 is a pair of women's jeans and item 250 is a pack of playing cards.

The product identification data received from the RFID tag 260 can be collected, analyzed and/or stored (e.g., in a memory or database) to identify the type, quantity and/or location of the RFID tags 260, and thus the type, quantity and/or location of the associated items. Generally, the product identification data is received from each of the RFID tags 260 over a limited period of time (e.g., several seconds or minutes) and/or while the RFID reader 300 is in a substantially static location so as to avoid reading RFID tags from other products in different locations (e.g., if the RFID reader 300 or antenna 310 is moved to a different location). It may, for example, be presumed that the RFID tags 260 do not move substantially while the product identification data is being acquired by the RFID reader 300. One or more characteristics associated with the items 220, 230, 240, 250 may be determined, for example, using the product identification data directly or by cross-referencing the product identification information with product characteristics stored in a database. For example, a product may be associated with characteristics such as brand name, model number, SKU number, and/or manufacturer identification number.

The product identification data can be received from the RFID tag 260 more than once over a period of time, for example, once per hour, once per day, etc. Thus, historical information about the items and the location of the items can be accumulated over time and stored, for example, in a memory or database. For example, the product identification data associated with the men's jeans 220 can be read by the RFID reader 300 at time $t_1$ while the jeans 220 are stored in a first location (e.g., a backroom), and subsequently read by the same RFID reader 300 at a later time $t_2$ after the jeans 220 have been moved from the first location to a second location (e.g., Department A). In this manner, a history of the location of the jeans 220 can be established. The RFID tags 260 may be read multiple times while the jeans 220 are at the second location.

In some embodiments, the RFID reader 300 is in a handheld or portable device. Before reading an RFID tag 260, the location of the RFID reader 300 is input by the user via, for example, the user interface 320 of the RFID reader 300. This technique depends on the user to input the correct location when moving the mobile RFID reader 300 from one location to another because the location of the RFID reader 300 is used to determine the location of the RFID tags 260, and thus the location of the associated products. If the incorrect location is input, or if the updated location is not input when the RFID reader 300 is moved from one location to another, then the product information data corresponding to the RFID tags 260 being read will contain incorrect location information.

Data collected by the RFID reader 300 can be used to identify items that have moved over time. For example, if a user of the RFID reader 300 is on the sales floor and reads an RFID tag 260 that was previously read in the backroom, the location of the RFID tag 260 can be updated to reflect having been moved from the backroom to the sales floor. However, in many instances, groups of products (e.g., two, three, four, five, six, seven, eight, nine, or ten or more) are not moved from one location in the store 100 to another location often, particularly after the products have been placed into stock on the sales floor. Therefore, the data collected by the RFID reader 300 can also be used to automatically identify the location of the RFID reader 300 based on the historical information for the RFID tags 260, including historical product location information. For instance, if the jeans 220 have been at location A for several consecutive RFID tag reads, the next time the RFID tags 260 for the jeans 220 are read, it can be assumed that the jeans, and therefore the RFID reader 300, are still at location A, even if the user entered an incorrect location into the RFID reader 300. Accordingly, the historical product location information can be used to determine if the user-entered location of the RFID reader 300 is consistent with the previously known location of the RFID tags 260 and to correct the location of the RFID reader 300 if it was incorrectly entered by the user or if the user moved to a different location without updating the location of the RFID reader 300. For example, if the user of the RFID reader 300 indicated that the reader 300 was being used, for example, in the backroom of the store 100 to read RFID tags for a certain product, but previously the same reader 300 was used to read the same tags on the sales floor of the store 100, it can be determined that the user-entered location of the reader 300 is incorrect based on the discrepancy (i.e., the reader 300 is most likely being used on the sales floor where the tags were previously read, and not in the backroom as indicated by the user).

Figure 4:
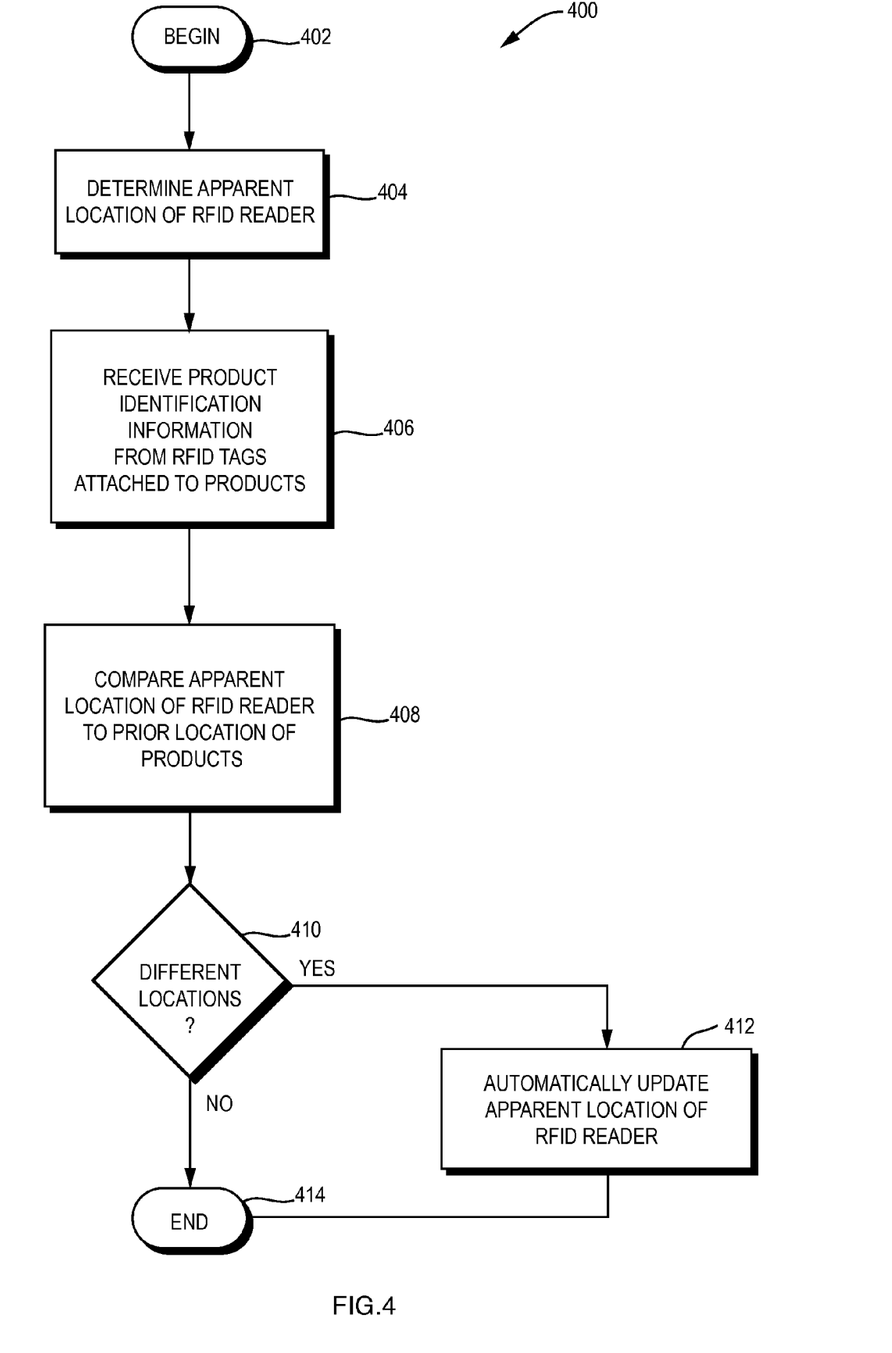
FIG. 4 is an example flow diagram of a process of determining the location of an RFID reader, in accordance with an embodiment.

FIG. 4 is a flow diagram of one example of a computer-executable process 400 for determining a location of an RFID reader using RFID tags. Process 400 begins at step 402. At step 404, apparent location information of the RFID reader (e.g., RFID reader 300 of FIG. 3) is determined. For example, the apparent location of the RFID reader may be manually input into the RFID reader by the user, determined from a default location or obtained from another source. The apparent location of the RFID reader may be, but is not necessarily, the actual location of the RFID reader. The apparent location is the location the RFID reader believes it is in. For instance, if the user inputs that the RFID reader is in location A, but the RFID reader is actually in location B, then the apparent location of the RFID reader is incorrect. This may occur, for example, if the user inputs the wrong location or if the user moves the RFID reader to a different location without inputting the correct, actual location.

At step 406, product identification information, or other data that can be used to uniquely identify a product, is received from a plurality of RFID tags (e.g., RFID tag 260 of FIG. 2). Each RFID tag is attached to a product directly or indirectly (e.g., products 220, 230, 240 and 250 of FIG. 2). The product identification information can be received using the RFID reader (e.g., RFID reader 300).

At step 408, the apparent location information of the RFID reader is compared to the prior location of the products as determined using the product identification information received at a prior time (e.g., during a previous read of the RFID tag associated with the product). This prior product information may be historical information acquired using the same RFID reader or a different RFID reader and stored in a memory or database. At step 410, if the apparent location information of the RFID reader is different than the prior location of the products on at least two different occasions prior to comparing the apparent location with the prior location information, then the apparent location of the RFID reader is automatically updated to match the prior location of the product at step 412. Otherwise, process 400 ends at step 414. In some embodiments, instead of, or in addition to, using the prior location of the products, the RFID reader can be used to read several RFID tags, and the apparent location of the RFID reader can be automatically updated based on the prior location of a majority of products associated with the read RFID tags. For example, if a majority of the read RFID tags are associated with men's jeans, then the apparent location of the RFID reader can be automatically updated to the prior or current location of the men's jeans (e.g., on the sales floor or in a storage area).

While embodiments have been discussed in the context of products in an retail environment, it will be appreciated that some embodiments may be used in a similar manner in other environments, such as warehousing, distribution, shipping, storage, or any other environment in which products or other objects having RFID tags may be tracked. For example, some embodiments may be used to determine the location of an RFID reader with respect to medical supplies in a hospital, cargo on a vessel, pallets in a distribution center and/or animals in a shelter. It will also be appreciated that, in some embodiments, the RFID tags may be attached to, for example, product packaging or shipping containers rather than, or in addition to, being attached directly to individual units of a product.

A variety of commercially available RFID tags, readers and integrated circuits are contemplated for use with various embodiments. For example, RFIC suppliers include NXP Semiconductors N.V. of Eindhoven, The Netherlands, Impinj of Seattle, Wash., and Alien Technology of Morgan Hill, Calif. In some embodiments, the RFID tags 260 can be embedded, affixed to or inlayed onto label material attached to each product.

Figure 5:
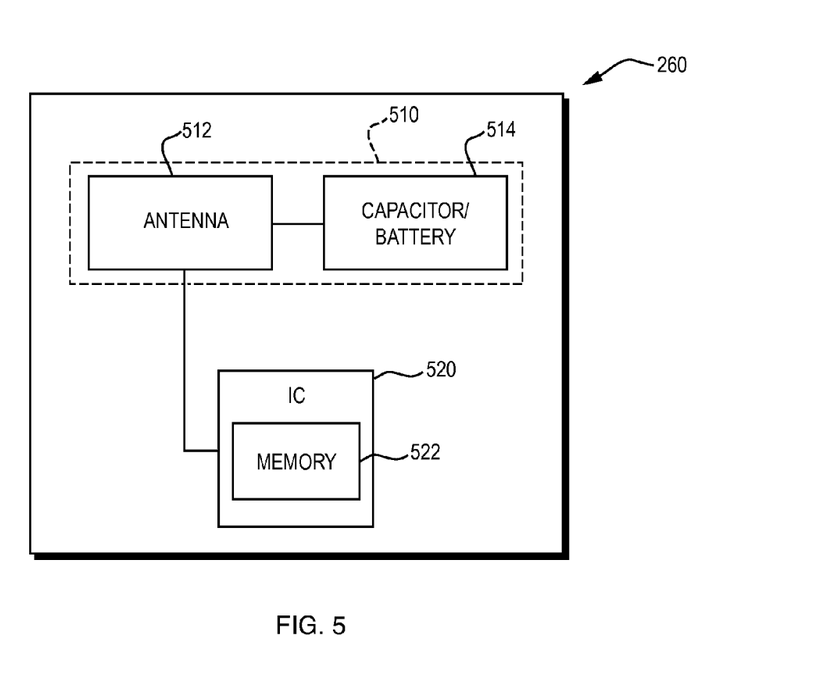
FIG. 5 is an example block diagram of an RFID tag for use with some embodiments.

FIG. 5 is a block diagram of an example of the RFID tag 260 of FIG. 2, which is suitable for use with various embodiments. The RFID tag 260 includes a passive resonant radio frequency (RF) circuit 510 for use in detecting when the tag 260 is within proximity of a reading range of a reader or interrogator, such as RFID reader 300 of FIG. 3. One example of the circuit 510 includes a coil antenna 512 and a capacitor or battery 514, which together form a resonant circuit with a predetermined resonant frequency, i.e., a selected radio frequency. Power for the RFID tag 260 is derived from the antenna 512 in the case where the tag is passive, or from the battery 514 where the tag is active or semi-passive. Furthermore, the RFID tag 260 includes an integrated circuit (IC) 520 for providing processing capabilities to the tag, as will be understood by one of skill in the art. The IC 520 is operatively coupled to the circuit 510. The IC 520 may, for example, include a programmable memory 522, such as a 96 bit memory, for storing identification data. It will be appreciated that other RFID tag designs may be used with certain embodiments, and embodiments are not limited to the particular tag design 260 described herein. For instance, the capacitor 514 may be located on the IC 520, with only an inductor coil (i.e., the antenna 512) being outside the IC 520.

The IC 520 can be configured to output a data stream of the data stored in the memory 522 when sufficient power is applied to the RFID tag 260. In one embodiment, the data stream creates a series of data pulses by switching an extra capacitor (not shown) across the coil antenna 512 over a period of time. This changes the resonant frequency of the RF circuit 510, detuning it from the operational frequency. Thus, instead of the RF circuit 510 returning a simple response signal, it returns, for example, a signal containing a packet of preprogrammed information (e.g., the identification data).

The packet of data is received and processed by interrogator receiving circuitry and is decoded (if necessary) to provide identification information about the item 220, 230, 240, 250 to which the RFID tag 260 is attached. Other methods of using the data in the IC memory 522 to output identification data from the tag 260 are contemplated and the above embodiment is not intended to be limiting. The IC 520 may be a passive device and is powered in the same manner as the RF circuit 510 (i.e., by using energy received at the antenna 512 from the RFID reader 300 transmitter signal). Other types of RFID tags may be used. In some embodiments, the RFID tags 260 are not reused; that is, they are not removed from the product when the product is sold or otherwise disposed of; however, in some embodiments the RFID tags 260 may be reused.

Figure 6:
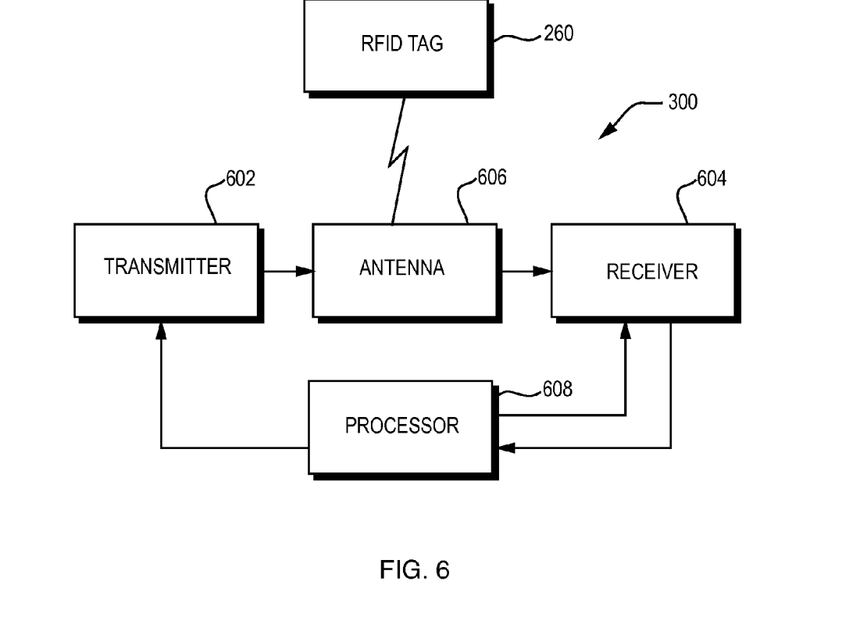
FIG. 6 is an example functional block diagram of an RFID reader for use with some embodiments.

FIG. 6 is a block diagram of an example of the RFID reader 300 of FIG. 3, which is suitable for use with the RFID tag 260 described with respect to FIG. 5. The RFID reader 300 and the RFID tag 260 can communicate by radio. The RFID reader 300 includes a transmitter 602, receiver 604, antenna 606, and data processing and control circuitry 608. An output of the transmitter 602 is operatively coupled to an input of the antenna 606. An output of the antenna 606 is operatively coupled to an input of the receiver 604. Outputs of the data processing and control circuitry 608 are operatively coupled to an input of the transmitter 602 and to an of the receiver 604, respectively. An output of the receiver 604 is operatively coupled to an input of the data processing and control circuitry 608.

Figure 7:
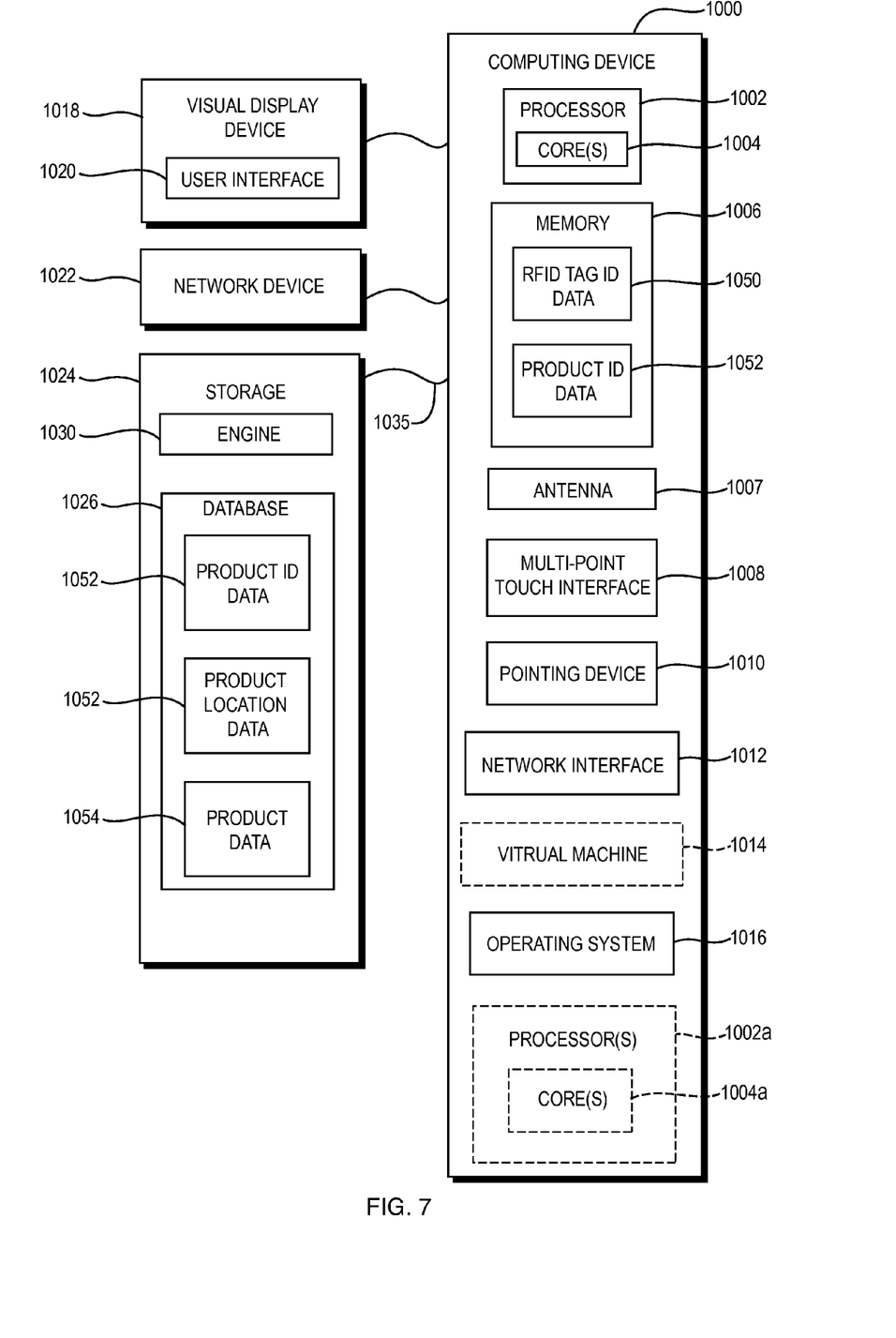
FIG. 7 is an example block diagram of an inventory management system for carrying out one or more embodiments.

FIG. 7 is a block diagram of an inventory management system configured in an exemplary computing device 1000 that may be used to implement exemplary embodiments described herein. In some embodiments, the computing device 1000 is included in an RFID reader (such as RFID reader 300 of FIG. 3), back office system and/or other computing resource. The computing device 1000 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 1006 included in the computing device 1000 may store non-transitory computer-readable and computer-executable instructions or software for implementing exemplary embodiments, such as process 400 (described above with respect to FIG. 4) of determining the location of the device 1000 (e.g., an RFID reader). The computing device 1000 also includes configurable and/or programmable processor 1002 and associated core 1004, and optionally, one or more additional configurable and/or programmable processor(s) 1002a and associated core(s) 1004a (for example, in the case of computer systems having multiple processors/cores), for executing non-transitory computer-readable and computer-executable instructions or software stored in the memory 1006 and other programs for controlling system hardware. Processor 1002 and processor(s) 1002a may each be a single core processor or multiple core (1004 and 1004a) processor.

Virtualization may be employed in the computing device 1000 so that infrastructure and resources in the computing device may be shared dynamically. A virtual machine 1014 may be provided to handle a process running on multiple processors so that the process appears to be using only one computing resource rather than multiple computing resources. Multiple virtual machines may also be used with one processor.

Memory 1006 may include a computer system memory or random access memory, such as DRAM, SRAM, EDO RAM, and the like. Memory 1006 may include other types of memory as well, or combinations thereof. Memory 1006 may be used to store information such as RFID tag identification data 1050, product location data 1052, product data 1054 (e.g., information about the characteristics of the product), and/or any other information. Memory 1006 may further be used to store historical information regarding any data stored therein (e.g., product location data 1052 for each time an RFID tag is read over a period of time).

A user may interact with the computing device 1000 through a visual display device 1018, such as a computer monitor or touch screen display integrated into the computing device 1000, which may display one or more user interfaces 1020 (e.g., the display 320 of FIG. 3) that may be provided in accordance with exemplary embodiments.

The computing device 1000 may include other I/O devices for receiving input from a user or data from an RFID tag, for example, an antenna 1007, a keyboard or any suitable multi-point touch interface 1008, or a pointing device 1010 (e.g., a mouse). The keyboard 1008 and the pointing device 1010 may be coupled to the visual display device 1018. The computing device 1000 may include other suitable conventional I/O peripherals.

The computing device 1000 may also include one or more storage devices 1024, such as a hard-drive, CD-ROM, or other non-transitory computer-readable media, for storing data and non-transitory computer-readable instructions and/or software that implement exemplary embodiments described herein. The storage devices 1024 may be integrated with the computing device 1000. The computing device 1000 may communicate with the one or more storage devices 1024 via a bus 1035. The bus 1035 may include parallel and/or bit serial connections, and may be wired in either a multi-drop (electrical parallel) or daisy-chain topology, or connected by switched hubs, as in the case of USB. Exemplary storage device 1024 may also store one or more databases 1026 for storing any suitable information required to implement exemplary embodiments. For example, exemplary storage device 1024 can store one or more databases 1026, for storing information, such as product identification information, product characteristics, and/or any other information. The storage device 1024 can also store an engine 1030 including logic and programming for determining the location of the device, and for performing one or more of the exemplary methods disclosed herein. The engine 1030 may, with respect to the example of FIG. 4, be configured to read as an input the prior location information associated with the products, compare the prior location information to the apparent location information, identify any difference based on the comparison, and update the apparent location information to the prior location information if there is a difference.

The computing device 1000 can include a network interface 1012 configured to interface via one or more network devices 1022 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1012 may include a built-in network adapter, network interface card, PCMCIA network card, card bus network adapter, wireless network adapter, USB network adapter, modem or any other device suitable for interfacing the computing device 1000 to any type of network capable of communication and performing the operations described herein. Moreover, the computing device 1000 may be any computer system, such as an RFID reader, workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 1000 may run any operating system 1016, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 1016 may be run in native mode or emulated mode. In an exemplary embodiment, the operating system 1016 may be run on one or more cloud machine instances.

Figure 8:
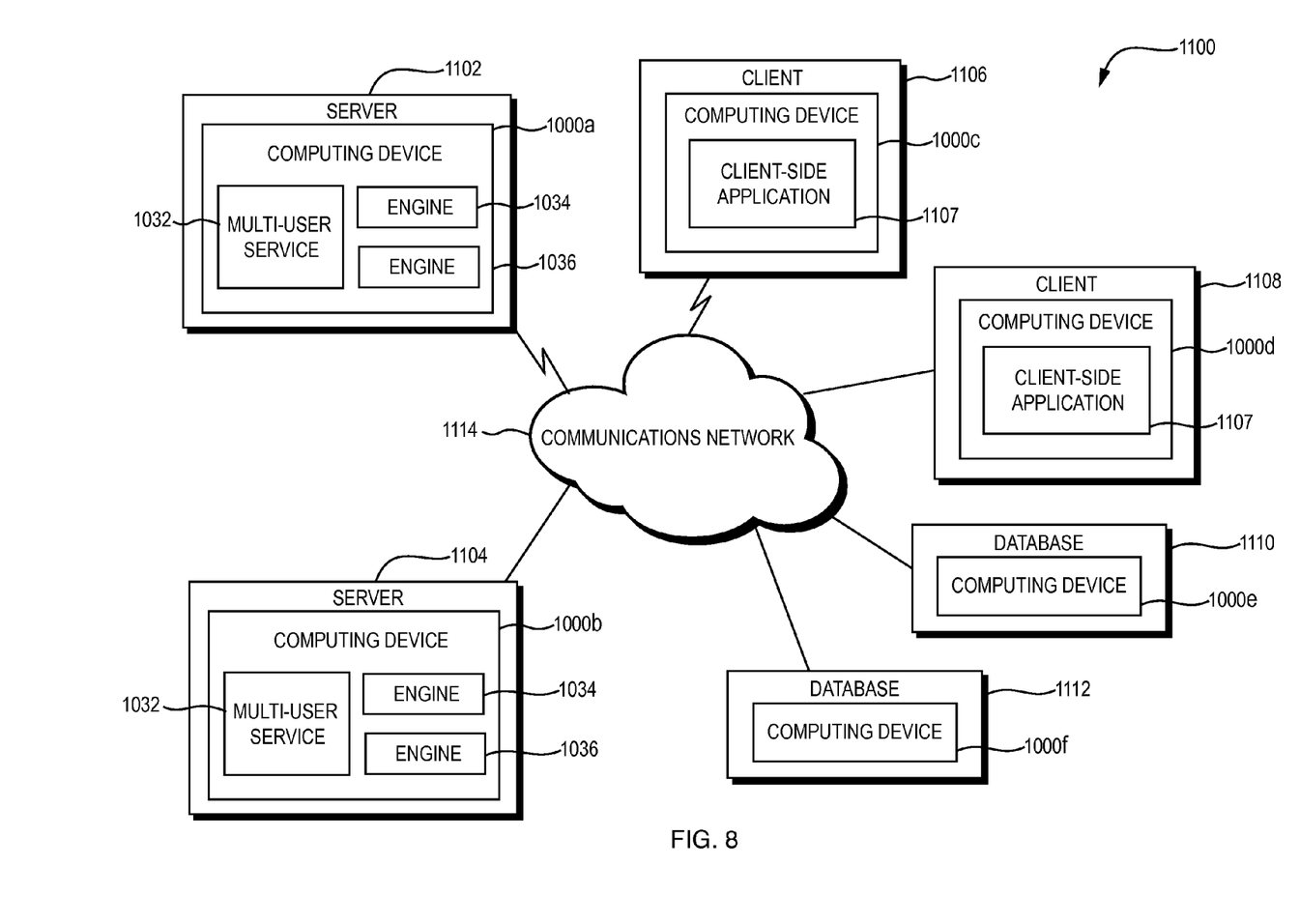
FIG. 8 is an example block diagram of a client-server inventory management environment for implementing one or more embodiments.

FIG. 8 is a block diagram of an exemplary network environment 1100 suitable for a distributed implementation of exemplary embodiments of an inventory management system, methods and non-transitory computer-readable media. The network environment 1100 may include one or more servers 1102 and 1104, one or more clients 1106 and 1108, and one or more databases 1110 and 1112, each of which can be communicatively coupled via a communication network 1114. The servers 1102 and 1104 may take the form of or include one or more computing devices 1000a and 1000b, respectively, that are similar to the computing device 1000 illustrated in FIG. 7. The clients 1106 and 1108 may take the form of or include one or more computing devices 1000c and 1000d, respectively, that are similar to the computing device 1000 illustrated in FIG. 7. For example, clients 1106 and 1108 may include mobile user devices. Similarly, the databases 1110 and 1112 may take the form of or include one or more computing devices 1000e and 1000f, respectively, that are similar to the computing device 1000 illustrated in FIG. 7. While databases 1110 and 1112 have been illustrated as devices that are separate from the servers 1102 and 1104, those skilled in the art will recognize that the databases 1110 and/or 1112 may be integrated with the servers 1102 and/or 1104 and/or the clients 1106 and 1108.

The network interface 1012 and the network device 1022 of the computing device 1000 enable the servers 1102 and 1104 to communicate with the clients 1106 and 1108 via the communication network 1114. The communication network 1114 may include, but is not limited to, the Internet, an intranet, a LAN (Local Area Network), a WAN (Wide Area Network), a MAN (Metropolitan Area Network), a wireless network, an optical network, and the like. The communication facilities provided by the communication network 1114 are capable of supporting distributed implementations of exemplary embodiments.

In exemplary embodiments, one or more client-side applications 1107 may be installed on client 1106 and/or 1108 to allow users of client 1106 and/or 1108 to access and interact with a multi-user service 1032 installed on the servers 1102 and/or 1104. For example, the users of client 1106 and/or 1108 may include users associated with an authorized user group and authorized to access and interact with the multi-user service 1032. In some embodiments, the servers 1102 and 1104 may provide client 1106 and/or 1108 with the client-side applications 1107 under a particular condition, such as a license or use agreement. In some embodiments, client 1106 and/or 1108 may obtain the client-side applications 1107 independent of the servers 1102 and 1104. The client-side application 1107 can be computer-readable and/or computer-executable components or products, such as computer-readable and/or computer-executable components or products for presenting a user interface for a multi-user service. One example of a client-side application is a web browser configured to display a web page containing the report data 124 and/or the workload estimate 126, the web page being hosted by the server 1102 and/or the server 1104, which may provide access to the multi-user service. Another example of a client-side application is a mobile application (e.g., a smart phone or tablet application) that can be installed on client 1106 and/or 1108 and can be configured and/or programmed to access a multi-user service implemented by the server 1102 and/or 1104. The servers 1102 and 1104 can also provide one or more engines 1034, 1036 including logic and programming for receiving the product location data 1052 and/or other data (e.g., product identification data), for performing one or more of the exemplary methods disclosed herein.

The databases 1110 and 1112 can store user information, manifest data, report data and/or any other information suitable for use by the multi-user service 1032. The servers 1102 and 1104 can be programmed to generate queries for the databases 1110 and 1112 and to receive responses to the queries, which may include information stored by the databases 1110 and 1112.

Having thus described several exemplary embodiments of the disclosure, it is to be appreciated various alterations, modifications, and improvements will readily occur to those skilled in the art. For example, it is contemplated that any item, product or good having an RFID tag associated with it can be the object of the disclosed systems and methods. Accordingly, the foregoing description and drawings are by way of example only.

What is claimed is:

1. A computer-implemented method of managing inventory, comprising:
  receiving, at an antenna operatively coupled to a radio-frequency identification (RFID) reader, product identification information encoded in an RF signal transmitted by a plurality of RFID tags, each of the plurality of RFID tags associated with a respective one of a plurality of products, the product identification information including product location information associated with each respective one of the plurality of products;
  processing, by a processor, the product identification information contained in a portion of the encoded RF signal to compare apparent location information associated with the RFID reader with historical location information associated with at least one of the plurality of products:,
  updating, by the processor, the apparent location information to match the historical location information where the historical location information associated with a majority of the plurality of products is different from the apparent location information; and
  updating the product location information to match the apparent location information where the historical location information associated with a majority of the plurality of products corresponds to the apparent location information,
wherein the historical location information includes the product location information acquired from at least one previous reading of at least one of the plurality of RFID tags associated with the at least one of the plurality of products by the RFID reader.

2. The computer-implemented method of claim 1, wherein comparing the apparent location information comprises retrieving, by the processor from a database, machine-readable product data representing the historical location information associated with each of the plurality of products.

3. The computer-implemented method of claim 1, wherein the historical location information includes product location information acquired from at least two previous readings of at least one of the plurality of RFID tags associated with the at least one of the plurality of products by the RFID reader.

4. The computer-implemented method of claim 1, further comprising displaying, by the processor via a display, at least one of the historical location information and the apparent location information.

5. The computer-implemented method of claim 1, further comprising displaying, by the processor via a display, a prompt for a user to manually update the apparent location information to match the historical location information where the apparent location information is different than the historical location information.

6. The computer-implemented method of claim 1, wherein the historical location information and the apparent location information each represent at least one physical location.

7. The computer-implemented method of claim 6, further comprising displaying, by the processor via a display, information representing the at least one physical location.

8. The computer-implemented method of claim 1, wherein the product identification information is received while the physical location of the reader is substantially static.

9. The computer-implemented method of claim 1, wherein the product identification information is read over a predetermined period of time.

10. An inventory management system comprising:
a programmable processor; and
a memory operatively coupled to the processor, the memory having stored thereon computer-executable instructions that when executed by the processor cause the processor to:
receive, at an antenna operatively coupled to a radio-frequency identification (RFID) reader, product identification information encoded in an RF signal transmitted by a plurality of RFID tags, each of the plurality of RFID tags associated with a respective one of a plurality of products, the product identification information including product location information associated with each respective one of the plurality of products;
process the product identification information contained in a portion of the encoded RF signal to compare apparent location information associated with the RFID reader with historical location information associated with each of the plurality of products, wherein the historical location information includes product location information acquired from at least one previous reading of at least one of the plurality of RFID tags associated with the at least one of the plurality of products by the RFID reader;
update the apparent location information to match the historical location information where the historical location information associated with a majority of the plurality of products is different from the apparent location information; and
update the product location information to match the apparent location information where the historical location information associated with a majority of the plurality of products corresponds to the apparent location information.

11. The system of claim 10, wherein the memory further comprises instructions that when executed by the processor cause the processor to compare the apparent location information by retrieving, from a database, machine-readable product data representing the historical location information associated with each of the plurality of products.

12. The system of claim 10, wherein the historical location information includes product location information acquired from at least two previous readings of at least one of the plurality of RFID tags associated with the at least one of the plurality of products by the RFID reader.

13. The system of claim 10, wherein the memory further comprises instructions that when executed by the processor cause the processor to display, via a display, at least one of the historical location information and the apparent location information.

14. The system of claim 10, wherein the historical location information and the apparent location information each represent at least one physical location.

15. The system of claim 14, wherein the memory further comprises instructions that when executed by the processor cause the processor to display, via a display, information representing the at least one physical location.

16. The system of claim 10, wherein the product identification information is received while the physical location of the reader is substantially static.

17. The system of claim 10, wherein the product identification information is received over a predetermined period of time.

18. A non-transitory computer-readable medium having stored thereon computer-executable instructions that when executed by a computer cause the computer to:
receive, at an antenna operatively coupled to a radio-frequency identification (RFID) reader, product identification information encoded in an RF signal transmitted by a plurality of RFID tags, each of the plurality of RFID tags associated with a respective one of a plurality of products, the product identification information including product location information associated with each respective one of the plurality of products;
process the product identification information contained in a portion of the encoded RF signal to compare apparent location information associated with the RFID reader with historical location information associated with at least one of the plurality of products, wherein the historical location information includes product location information acquired from at least one previous reading of at least one of the plurality of RFID tags associated with the at least one of the plurality of products by the RFID reader;
update the apparent location information to match the historical location information where the historical location information associated with a majority of the plurality of products is different from the apparent location information; and
update the product location information to match the apparent location information where the historical location information associated with a majority of the plurality of products corresponds to the apparent location information.

19. The computer-readable medium of claim 18, wherein the historical location information includes product location information acquired from at least two previous readings of at least one of the plurality of RFID tags associated with the at least one of the plurality of products by the RFID reader.

\* \* \* \* \*